US010336558B2

(12) United States Patent
Matsunari et al.

(10) Patent No.: US 10,336,558 B2
(45) Date of Patent: Jul. 2, 2019

(54) TRANSFER APPARATUS, TRANSFER SYSTEM, AND TRANSFER METHOD

(71) Applicant: HIRATA CORPORATION, Shinagawa-ku, Tokyo (JP)

(72) Inventors: Shinichi Matsunari, Tokyo (JP); Akemichi Yamamoto, Tokyo (JP)

(73) Assignee: HIRATA CORPORATION, Shinagawa-Ku, Tokyo (JP)

( * ) Notice: Subject to any disclaimer, the term of this patent is extended or adjusted under 35 U.S.C. 154(b) by 565 days.

(21) Appl. No.: 14/859,834

(22) Filed: Sep. 21, 2015

(65) Prior Publication Data

US 2016/0096690 A1 Apr. 7, 2016

(30) Foreign Application Priority Data

Oct. 7, 2014 (JP) .................................. 2014-206663

(51) Int. Cl.
*B65G 47/90* (2006.01)
*B25J 5/02* (2006.01)
(Continued)

(52) U.S. Cl.
CPC ............. *B65G 47/902* (2013.01); *B23Q 7/04* (2013.01); *B25J 5/02* (2013.01); *B25J 9/0087* (2013.01);
(Continued)

(58) Field of Classification Search
CPC ........ B65G 47/902; B65G 47/905; B25J 5/02; B25J 9/0087; B25J 15/0052; B25J 9/04; B23Q 7/04; Y10S 901/49
(Continued)

(56) References Cited

U.S. PATENT DOCUMENTS 4,505,636 A * 3/1985 Sugino ................. B25J 17/0241
294/86.4
4,808,059 A 2/1989 Eddy
(Continued)

FOREIGN PATENT DOCUMENTS

CN 101890711 A 11/2010
CN 102272025 A 12/2011
(Continued)

OTHER PUBLICATIONS

Extended European Search Report dated Mar. 23, 2016, issued by the European Patent Office in the corresponding European Application No. 15002872.8. (11 pages).
(Continued)

*Primary Examiner* — Michael S Lowe
(74) *Attorney, Agent, or Firm* — Buchanan Ingersoll & Rooney PC (57) ABSTRACT

This invention provides a transfer apparatus for loading/unloading a work into/from a processing apparatus, comprising: a main body being able to move in a horizontal direction; an arm portion pivotally provided with respect to the main body; a hand portion pivotally provided with respect to the arm portion, and configured to grip the work; and a control unit configured to horizontally swing the arm portion and move the main body in order for the hand portion to linearly move the work, when the hand portion facing the processing apparatus loads/unloads the work into/from the processing apparatus.

8 Claims, 6 Drawing Sheets

(51) Int. Cl.
  *B25J 9/00* (2006.01)
  *B25J 9/04* (2006.01)
  *B25J 15/00* (2006.01)
  *B23Q 7/04* (2006.01)
(52) U.S. Cl.
  CPC .............. *B25J 9/04* (2013.01); *B25J 15/0052* (2013.01); *B65G 47/905* (2013.01)
(58) Field of Classification Search
  USPC ........................................................ 414/741
  See application file for complete search history.

(56) References Cited

U.S. PATENT DOCUMENTS

| | | | | |
|---|---|---|---|---|
| 5,025,690 | A | * | 6/1991 | Myers .................... B23Q 1/015 82/121 |
| 6,039,375 | A | * | 3/2000 | Bauman ............... B25J 15/0253 294/119.1 |
| 7,300,084 | B2 | * | 11/2007 | Chae ........................ B25J 9/023 294/119.1 |
| 7,331,094 | B2 | * | 2/2008 | Berninger .......... B23K 37/0435 269/37 |
| 8,606,394 | B2 | * | 12/2013 | Okahisa ..................... B25J 5/02 414/282 |
| 9,174,346 | B2 | | 11/2015 | Ando |
| 2002/0156730 | A1 | * | 10/2002 | Newman ................ G06Q 10/10 705/40 |
| 2012/0050912 | A1 | * | 3/2012 | Lee ....................... F16C 17/045 360/99.08 |

FOREIGN PATENT DOCUMENTS

| | | |
|---|---|---|
| CN | 103707285 A | 4/2014 |
| CN | 203622149 U | 6/2014 |
| CN | 203875678 U | 10/2014 |
| EP | 0 067 882 A1 | 12/1981 |
| EP | 2 253 434 A1 | 11/2010 |
| JP | S57-114389 A | 7/1982 |
| JP | S63-074546 A | 4/1988 |
| JP | 08-119409 A | 5/1996 |
| JP | 2000-200810 A | 7/2000 |
| JP | 2004-265894 A | 9/2004 |
| JP | 2005-142462 A | 6/2005 |
| JP | 4217125 B2 | 1/2009 |
| JP | 4824648 B2 | 11/2011 |
| KR | 10-2014-0057428 A | 5/2014 |

OTHER PUBLICATIONS

Office Action dated May 22, 2017, by the Chinese Patent Office in corresponding Chinese Patent Application No. 201510638907.5. (11 pages).

Office Action dated Feb. 9, 2018 by the Chinese Patent Office in corresponding Chinese Patent Application No. 201510638907.5.

Office Action dated Jul. 6, 2018, in corresponding Japanese Patent Application No. 2014-206663, and an English language translation thereof.

* cited by examiner

TRANSFER APPARATUS, TRANSFER SYSTEM, AND TRANSFER METHOD

BACKGROUND OF THE INVENTION

Field of the Invention

The present invention relates to a transfer apparatus, transfer system and transfer method and, more particularly, to a transfer robot for loading and unloading a work into and from a processing apparatus.

Description of the Related Art

For example, a transfer system which loads a work into a processor, unloads a processed work, and transfers the work to another place uses a transfer apparatus for loading and unloading a work into and from the processor. This transfer apparatus includes an arm which linearly moves a work with respect to the processor in order to rapidly load and unload the work into and from the processor. For example, Japanese Patent Laid-Open No. 2000-200810 describes a transfer apparatus including a sliding arm. Also, Japanese Patent No. 4824648 describes a transfer apparatus including an articulated arm. In addition, Japanese Patent No. 4217125 describes a transfer apparatus including a pair of arms.

When the sliding arm described in Japanese Patent Laid-Open No. 2000-200810 is used in an environment in which chips or the like are scattered, the arm sometimes stops or breaks down if a chip or the like sticks to a guide groove which is exposed when the arm extends. The articulated arm described in Japanese Patent No. 4824648 complicates the structure because a link mechanism is adopted. Also, if a motor which directly drives each arm is installed in each joint instead of the link mechanism, the size of the apparatus increases for avoiding interference between each motor and each arm.

SUMMARY OF THE INVENTION

It is, therefore, an object of the present invention to provide a transfer apparatus using a small number of joints and having a compact apparatus configuration.

According to an aspect of the present invention, there is provided a transfer apparatus for loading/unloading a work into/from a processing apparatus, comprising: a main body being able to move in a horizontal direction; an arm portion pivotally provided with respect to the main body; a hand portion pivotally provided with respect to the arm portion, and configured to grip the work; and a control unit configured to horizontally swing the arm portion and move the main body in order for the hand portion to linearly move the work, when the hand portion facing the processing apparatus loads/unloads the work into/from the processing apparatus.

According to another aspect of the present invention, there is provided a transfer apparatus for loading/unloading a work into/from a plurality of processing apparatuses, comprising: a main body being able to move in a horizontal direction; an arm portion pivotally provided with respect to the main body; a hand portion pivotally provided with respect to the arm portion, and configured to grip the work; a control unit configured to horizontally swing the arm portion and move the main body in order for the hand portion to linearly move the work, when the hand portion facing the processing apparatus loads/unloads the work into/from the processing apparatus; and a lifting mechanism supporting the arm portion so as to move the arm portion up and down, wherein the arm portion is connected to a pivot of the main body at one end side thereof and to the hand portion at the other end side thereof, the hand portion has a main body of the hand portion connected to the arm portion and a chuck portion provided to the main body of the hand portion, the chuck portion is configured to grip the work and pivot around an axis being parallel to a direction for loading/unloading a work into/from a processing apparatus, the control unit configured to further control the up and down movement of the lifting mechanism and pivoting of the chuck portion in order to load/unload the work into/from each of the plurality of the processing apparatuses.

According to still another aspect of the present invention, there is provided a transfer system for loading/unloading a work into/from a plurality of processing apparatuses, comprising: a transfer path arranged along a plurality of loading/unloading ports of the processing apparatuses; and a transfer apparatus configured to load/unload the work into/from the processing apparatus, wherein the transfer apparatus comprises: a main body being able to move in a horizontal direction along the transfer path; an arm portion pivotally provided with respect to the main body; a hand portion pivotally provided with respect to the arm portion, and configured to grip the work; a first control unit configured to horizontally swing the arm portion and move the main body in order for the hand portion to linearly move the work, when the hand portion facing the processing apparatus loads/unloads the work into/from the processing apparatus; and a second control unit configured to control the hand portion and the first control unit based on a signal from the processing apparatus.

According to still another aspect of the present invention, there is provided a transfer method of loading/unloading a work into/from a processing apparatus by using a transfer apparatus, wherein the transfer apparatus comprises a main body being able to move in a horizontal direction, an arm portion pivotally provided with respect to the main body, and a hand portion pivotally provided with respect to the arm portion and configured to grip the work, the transfer method comprises: a moving of the transfer apparatus gripping the work to the processing apparatus; and an operating for the main body, the arm portion, and the hand portion in cooperation with each other in order for the hand portion to linearly move the work, when the hand portion facing the processing apparatus loads/unloads the work into/from the processing apparatus, and based on the operating, the transfer method performs: a swinging of the arm portion horizontally; a moving of the main body in the horizontal direction; and a swinging of the hand portion such that one side surface of the work faces the processing apparatus while moving.

According to still another aspect of the present invention, there is provided a transfer method of loading/unloading a work into/from a plurality of processing apparatuses by using a transfer apparatus, wherein the transfer apparatus comprises a main body being able to move in a horizontal direction, an arm portion pivotally provided with respect to the main body, and a hand portion pivotally provided with respect to the arm portion and configured to grip the work, the transfer method comprises: a moving of the transfer apparatus gripping the work to any one of the processing apparatuses; and an operating for the main body, the arm portion, and the hand portion in cooperation with each other in order for the hand portion to linearly move the work with respect to each processing apparatus, when the hand portion facing the processing apparatus loads/unloads the work into/from any one of the processing apparatuses, and based on the operating, the transfer method performs: a swinging of the arm portion horizontally; a moving of the main body in the horizontal direction; and a swinging of the hand portion such that one side surface of the work faces the processing apparatus while moving.

Further features of the present invention will become apparent from the following description of exemplary embodiments (with reference to the attached drawings).

DESCRIPTION OF THE EMBODIMENTS

Exemplary embodiments of the present invention will be explained below with reference to the accompanying drawings. Note that the same reference numerals denote the same elements in these drawings. Note also that in these drawings, the vertical and horizontal directions on the drawing surface are used as the vertical and horizontal directions of an apparatus and system in each embodiment in the explanation of this specification.

<Transfer Apparatus 1>

Figure 1A:
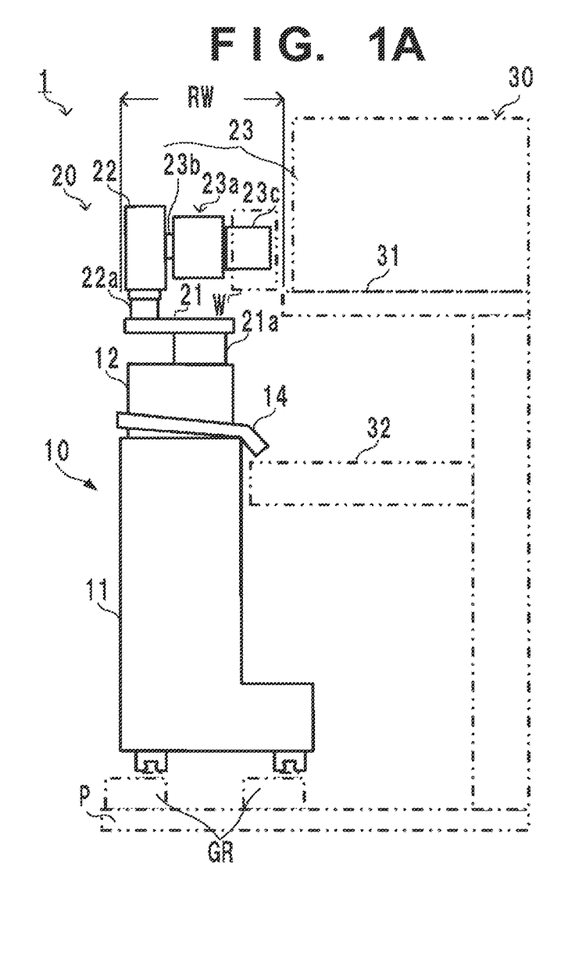
FIGS. 1A, 1B, and 1C are a side view, plan view, and front view, respectively, of a transfer apparatus according to an embodiment of the present invention.
Figure 1B:
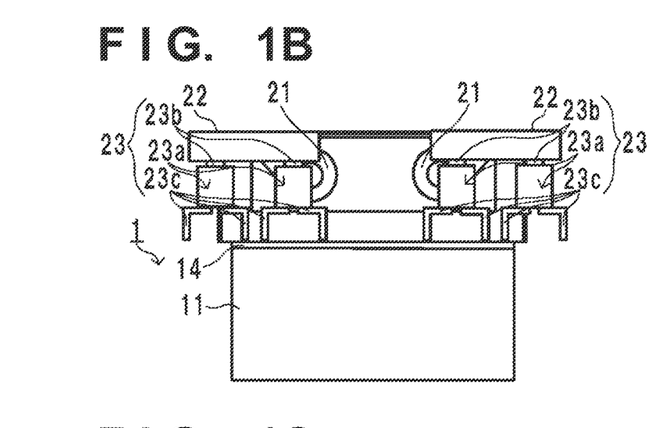
Figure 1C:
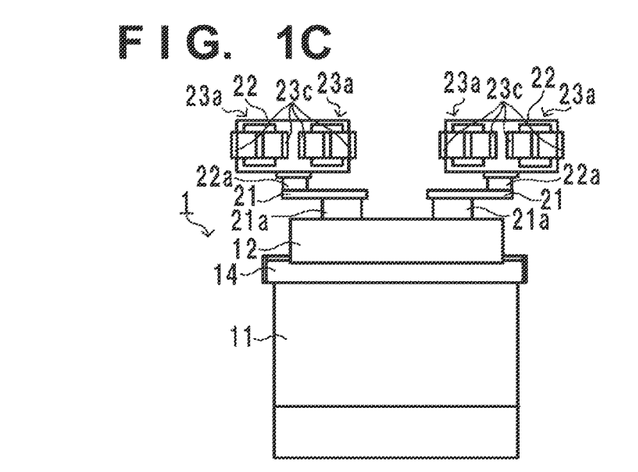

FIGS. 1A, 1B, and 1C are views showing a transfer apparatus 1 according to an embodiment of the present invention. That is, FIGS. 1A, 1B, and 1C are respectively a side view, plan view, and front view. Referring to FIG. 1A, the alternate long and two short dashed lines indicate a processing apparatus 30 (to be described later), loading/unloading guide 31, and oil pan 32, in order to explain the positions of the processing apparatus 30 and transfer apparatus 1. The transfer apparatus 1 as a transfer robot includes a main body 10, a transfer arm 20, and a part of a control apparatus 40 (see FIG. 4) (to be described later). The main body 10 includes a running main body 11 and robot main body 12.

Referring to FIG. 1A, the running main body 11 includes a pinion (not shown) which engages with a rack (not shown) laid on a transfer path P, and can horizontally move along guide rails GR laid on the transfer path P by driving the pinion. Note that in this embodiment, the horizontal direction is not limited to the direction of a plane perpendicular to the direction in which the gravity works, and includes the direction of a plane parallel to the installation surface such as the floor surface on which a transfer system and the like of this embodiment are installed. The running main body 11 further includes a lifting mechanism 13 (see FIG. 2A) for moving the robot main body 12 up and down, a running motor (not shown) for driving the pinion, and Cableveyor® (not shown) accommodating lines for, for example, supplying electricity to the running motor.

<Transfer Arm 20>

The robot main body 12 mounted on the running main body 11 includes two transfer arms 20. One transfer arm 20 includes an arm portion 21 formed to be pivotal with respect to the robot main body 12, and a hand portion 22 which is formed to be pivotal with respect to the arm portion 21 and grips a work W. The arm portion 21 is a plate-like member (see FIG. 2B) having a large width on one end and a small width on the other end in a planar view. In other words, the arm portion 21 is an elliptical plate member having a narrowed distal end. One end portion as the proximal end of the arm portion 21 is pivotally connected to the robot main body 12 by an arm pivoting shaft 21a, and the hand portion 22 is pivotally connected to the other end portion as the abovementioned distal end. The arm portion 21 can horizontally pivot above the robot main body 12 around the arm pivoting shaft 21a by an arm portion driving mechanism formed in the robot main body 12. Note that "horizontal pivot" means that the arm portion 21 is horizontally movable around the arm pivoting shaft 21a. Also, the arm portion 21 is not limited to the aforementioned plate-like member having a large width on one end and a small width on the other end in a planar view, and may also be, for example, a plate-like member having a rectangular shape in a planar view.

The hand portion 22 is a rectangular parallelepiped member having a rectangular shape in a planar view, and incorporates a hand portion driving mechanism, and a pivoting mechanism for pivoting a chuck portion 23 (to be described later). The hand portion driving mechanism pivots the hand portion 22 with respect to the arm portion 21 around a hand pivoting shaft 22a arranged parallel to the arm pivoting shaft 21a. Namely, the arm portion 21 is connected to the pivoting shaft 21a of the robot main body 12 at one end side thereof and to the hand portion 22 at the other side thereof. The hand portion 22 has a main body of the hand portion 22 connected to the arm portion 21 and two chuck portions 23, 23 provided to the main body of the hand portion 22 and configured to grip the work W. Note that an example of each of the arm portion driving mechanism and hand portion driving mechanism is a driving source such as a motor, but each mechanism is not limited to this.

One hand portion 22 includes two chuck portions 23 (see FIG. 1B or 1C). One chuck portion 23 includes a gripping mechanism 23a for gripping the work W, and a chuck pivoting shaft 23b as a part of a pivoting mechanism which pivots the gripping mechanism 23a around a horizontal axis perpendicular to the opening/closing direction of the gripping mechanism 23a. Note that a driving source which pivots the chuck pivoting shaft 23b and is a part of the pivoting mechanism is incorporated into the hand portion 22, and an example is a driving source such as a motor, but the driving source is not limited to this. That is, the pivoting mechanism includes the chuck pivoting shaft 23b and its driving source. To grip the work W, the gripping mechanism 23a includes a pair of L-shaped gripping portions 23c, and a gripping portion driving mechanism (not shown) for driving the gripping portions 23c. Note that examples of the gripping portion driving mechanism are a compression spring, a motor, and an actuator such as a hydraulic cylinder, but the mechanism is not limited to these examples.

FIG. 1A shows the state of a backward position at which the transfer arms 20 have moved backward from the processing apparatus 30. The backward position of the transfer arms 20 is a position where the hand portions 22 and chuck portions 23 are spaced apart from the processing apparatus 30 because the end portions of the arm portions 21 at which the hand portions 22 are formed have moved away from the processing apparatus 30 (see FIGS. 1A and 1B). In this state, the distal ends of the gripping portions 23c of the chuck portions 23 are spaced apart by a predetermined distance from the processing apparatus 30, so the transfer arms 20 fall within the range of a running width RW shown in FIG. 1A.

The running width RW is a region which is set above the transfer path P and through which the transfer arms 20 pass when the running main body 11 moves. Accordingly, when the transfer apparatus 1 moves on the guide rails GR in the backward position of the transfer arms 20, the transfer apparatus 1 can move such that the chuck portions 23 of the transfer arms 20 do not collide against the processing apparatus 30 and the like.

When the transfer apparatus 1 moves in this state, a region which secures safety by the amount of the running width RW when the transfer arms 20 move need only be set near the processing apparatus 30. For example, when using a conventional transfer apparatus using a gantry for work movement, the whole of a processing apparatus and the transfer apparatus must be surrounded by safety fences. When using the transfer apparatus 1 according to this embodiment, however, only a part of the transfer apparatus 1 including the running width RW need only be surrounded by safety fences. Therefore, the installation area of the safety fences can be reduced. In addition, since the installation area of the safety fences can be reduced, it is possible to stop one of a plurality of processing apparatuses 30, and easily maintain the stopped processing apparatus 30 from the opposite side of the processing apparatus 30 across the transfer path P. This makes it possible to maintain only one processing apparatus 30 without stopping the whole transfer system.

Also, below the loading/unloading guide 31 of the processing apparatus 30, the oil pan 32 for receiving chips, cutting oil, and the like dropping from the work W when the transfer arm 20 unloads the work W from a loading/unloading port of the processing apparatus 30 is formed. In addition, in a lower portion of the robot main body 12, a cover member 14 for preventing the abovementioned chips, cutting oil, and the like from entering the transfer path P is formed above the oil pan 32. Furthermore, the cover member 14 has a surface inclining toward the oil pan 32, and guides the chips, cutting oil, and the like dropped on the cover member 14 to the oil pan 32.

<Operation of Transfer Arms 20>

Figure 2A:
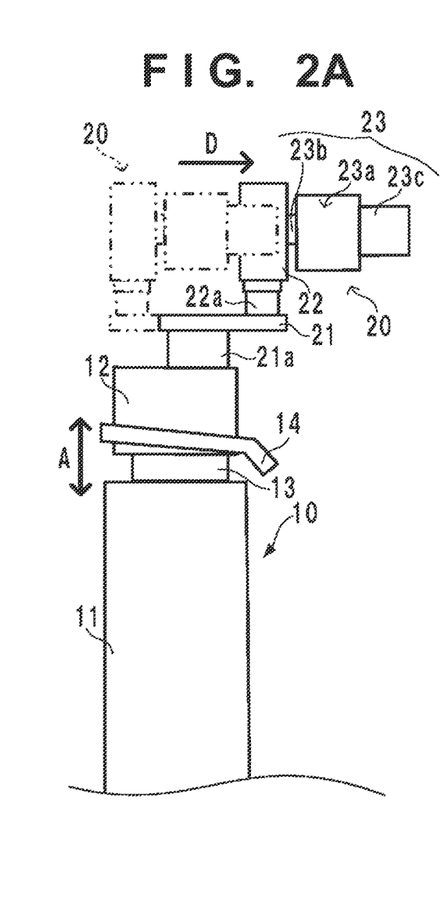
FIGS. 2A, 2B, and 2C are a side view, plan view, and front view, respectively, for explaining the operation of the transfer apparatus.
Figure 2B:
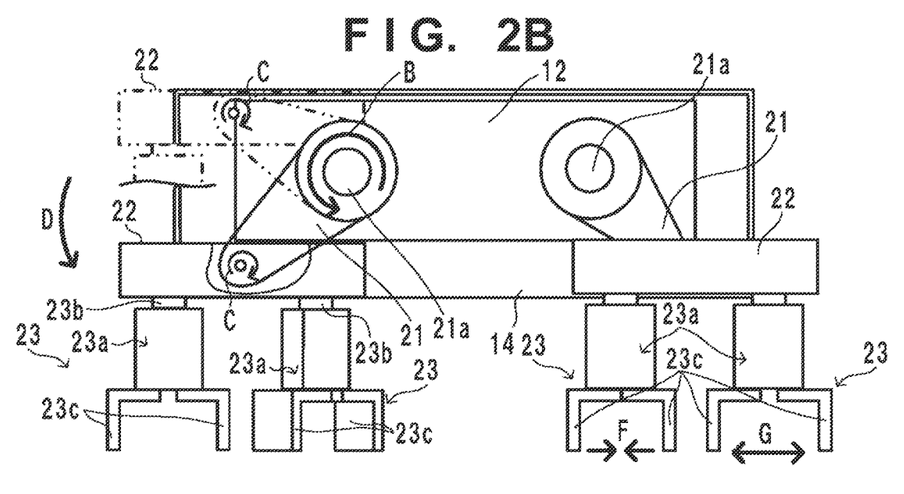
Figure 2C:
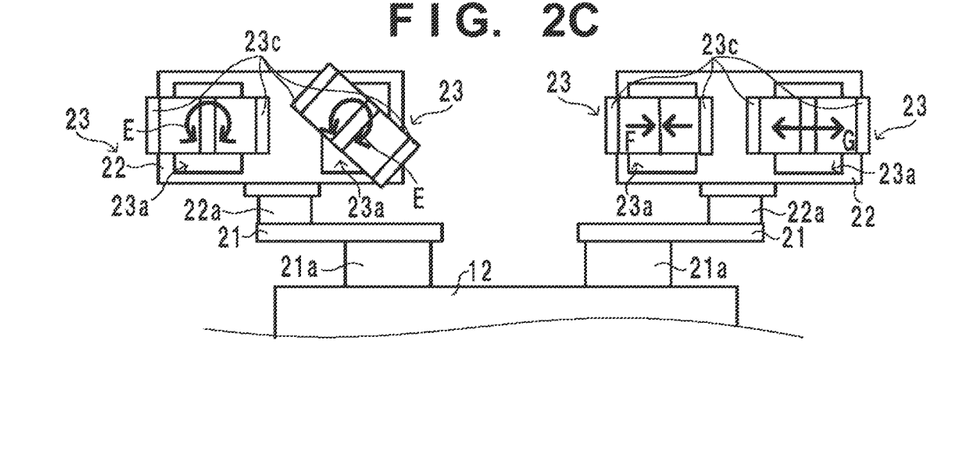

The operation of the transfer arms 20 of the transfer apparatus 1 will be explained in detail below with reference to FIGS. 2A, 2B, and 2C. FIG. 2A is a side view showing a part of the transfer apparatus 1 in an enlarged scale. FIG. 2B is an enlarged plan view of the robot main body 12 viewed from above the transfer apparatus 1. FIG. 2C is an enlarged front view of the robot main body 12. Referring to FIG. 2A, the lifting mechanism 13 formed in the running main body 11 can move the robot main body 12 and transfer arms 20 in the vertical direction (the directions of arrows A in FIG. 2A) with respect to the running main body 11. Also, the transfer arm 20 can move from the backward position indicated by the alternate long and two dashed lines in FIG. 2A to a forward position indicated by the solid lines by pivoting the arm portion 21 and hand portion 22, thereby moving the hand portion 22 toward the processing apparatus 30. In the forward position, the chuck portion 23 of the transfer arm 20 is positioned above the loading/unloading guide 31 of the processing apparatus 30, and the gripping portions 23c of the chuck portion 23 can place the gripped work W on the loading/unloading guide 31.

An operating of moving the transfer arm 20 from the backward position to the forward position will be explained with reference to FIG. 2B. The arm portion driving mechanism formed in the robot main body 12 pivots the arm portion 21 from the backward position indicated by the alternate long and two short dashed lines in FIG. 2B in the direction of an arrow B (counterclockwise in FIG. 2B) around the arm pivoting shaft 21a. At the same time, the hand portion 22 moves downward in FIG. 2B from the state of the backward position (the alternate long and two short dashed lines in FIG. 2B) to the state of the forward position (the solid lines in FIG. 2B). Note that FIG. 2B is partially broken in order to clarify the position of the arm portion 21 in the hand portion 22 in the forward position. In this state, the hand portion 22 is pivoted in the direction of an arrow C (clockwise in FIG. 2B) around the hand pivoting shaft 22a, so that one side surface of the hand portion 22 on which the chuck portion 23 is formed moves while facing the same direction (downward in FIG. 2B). Therefore, the chuck portion 23 of the hand portion 22 is so adjusted as to always face the loading/unloading port (downward in FIG. 2B) of the processing apparatus 30, and one side surface of the work W is moved to face the loading/unloading port of the processing apparatus 30 into which the work W is to be loaded. Also, the locus of the movement of the hand portion 22 in this state is the locus on an arc around the arm pivoting shaft 21a, which is indicated by an arrow D in FIG. 2B.

Thus, the transfer arm 20 shown in FIG. 2A can move in the direction of the arrow D (rightward in FIG. 2A) from the backward position indicated by the alternate long and two short dashed lines in FIG. 2A to the forward position indicated by the solid lines. Note that the abovementioned movement of the transfer arm 20 is explained by using the left-hand transfer arm 20 shown in FIG. 2B, but the right-hand transfer arm 20 shown in FIG. 2B can also move from the backward position to the forward position by similarly pivoting the arm portion 21 and hand portion 22.

The operation of the chuck portion 23 will be explained with reference to FIGS. 2B and 2C. The chuck portion 23 can pivot in the directions of arrows E (both clockwise and counterclockwise) in FIG. 2C around the chuck pivoting shaft 23b by the abovementioned pivoting mechanism (see the left-hand chuck portions 23 shown in FIG. 2C). Also, as shown in FIGS. 2B and 2C, the gripping portions 23c of the chuck portion 23 can open and close by the abovementioned gripping portion driving mechanism (see the right-hand gripping portions 23c shown in FIGS. 2B and 2C). The pair of gripping portions 23c form a closed state by moving close to each other in the directions of arrows F in FIGS. 2B and 2C, and form an open state by moving away from each other in the directions of arrows G. Furthermore, the gripping mechanism 23a includes a chuck sensor for sensing whether the gripping portions 23c are gripping the work W. This chuck sensor is, for example, a sensor with which a switch operates in accordance with the closed state and open state of the gripping portions 23c. The chuck sensor is formed on at least one of the opposing surfaces of the pair of gripping portions 23c. Examples are a pressure sensor, photoelectric sensors which emit light from one sensor to the other, and a sensor which reacts with, for example, a metal portion of the work W in contact with the gripping portions 23c. However, the chuck sensor is not limited to these examples.

<Transfer System 100>

Figure 3:
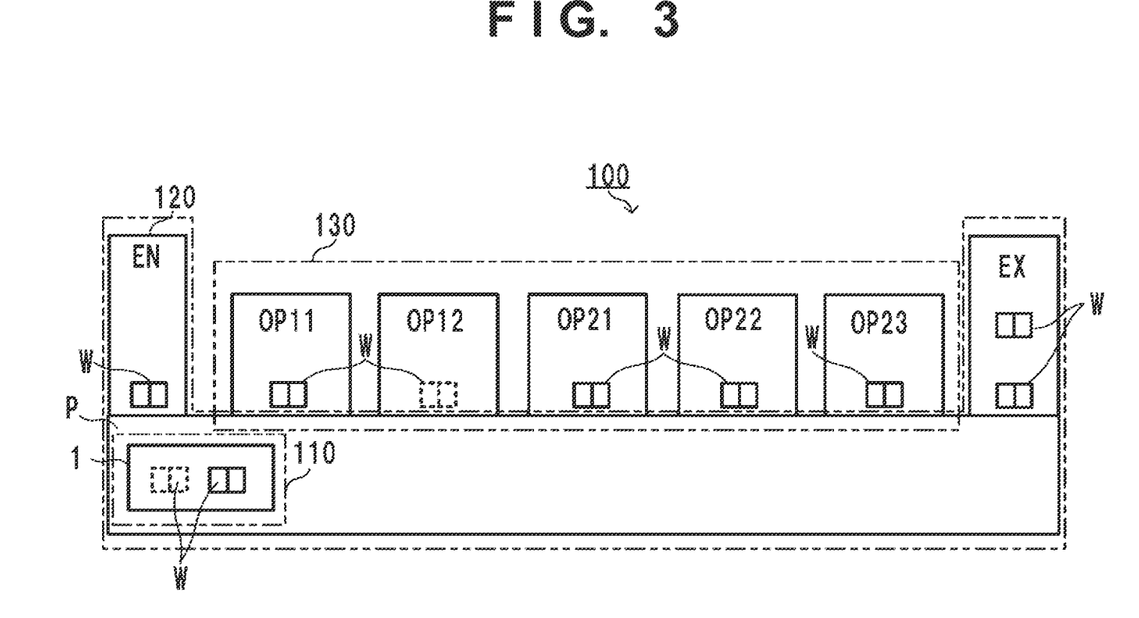
FIG. 3 is a view for explaining a transfer system according to the embodiment of the present invention.

A transfer system 100 as an embodiment of the present invention will be explained with reference to FIG. 3. In FIG. 3, the transfer apparatus 1 indicated by a rectangle for the sake of descriptive simplicity is arranged on the transfer path P. Assume that the left-hand side and right-hand side along the transfer path P in FIG. 3 are the upstream side and downstream side, respectively, in the following explanation. As the processing apparatuses 30, the transfer system includes a work loading unit EN, a plurality of processors OP11, OP12, OP21, OP22, and OP23, and a work unloading unit EX. The work loading unit EN is arranged on the upstream end of the transfer path P, and the work unloading unit EX is arranged on the downstream end of the transfer path P. The plurality of processors OP11, OP12, OP21, OP22, and OP23 are so arranged that their loading/unloading ports face the transfer path P. Note that in the following explanation, a processor OP indicates not a specific processor but any one of the plurality of processors OP11, OP12, OP21, OP22, and OP23.

In this embodiment, it is assumed that the processor OP processes a set of two works W. In FIG. 3, a set of two works N are represented by combining two rectangles. Furthermore, the aforementioned transfer apparatus 1 includes the two transfer arms 20, each transfer arm 20 includes the two chuck portions 23, and each chuck portion 23 can grip one work. Accordingly, one transfer arm 20 transfers one work W shown in FIG. 3. Also, one transfer apparatus 1 includes the two transfer arms 20, and hence can simultaneously transfer two works W. In addition, when one of the two transfer arms 20 grips the work W and the other transfer arm 20 does not grip any work W, it is possible to unload a processed work W from the processor OP and load an unprocessed work W into the processor OP in quick succession by moving the transfer apparatus 1 once. Note that FIG. 3 shows a state in which the work W exists by the solid lines, and shows a state in which no work W exists by the broken lines. For example, in the transfer apparatus 1 shown in FIG. 3, one arm (on the right side in FIG. 3) is holding the work W, and the other arm (on the left side in FIG. 3) is not holding any work W.

The work loading unit EN is an apparatus which transfers a work supplied by a worker from outside the transfer system to the transfer apparatus 1. The work W supplied to the work loading unit EN is moved to the unloading port of the work loading unit EN, which faces the transfer path P.

This embodiment adopts two types of processors OP as the plurality of processors OP11, OP12, OP21, OP22, and OP23, so different processes can be performed. For example, the processors OP11 and OP12 perform a first process such as a cutting process, and the processors OP21, OP22, and OP23 perform a second process such as a polishing process.

The work W processed by the processor OP is transferred to the work unloading unit EX, and unloaded from the work unloading unit EX by a transfer device or worker.

In the work system 100 of this embodiment, the work N is loaded from the work loading unit EN into the processors OP11 and OP12 for performing the first process, the work W having undergone the first process is loaded into the processors OP21, OP22, and OP23 for performing the second process, and the work W having undergone the second process is loaded into the work unloading unit EX. Note that this transfer system has been explained by taking, as an example, the case in which the works W are processed in order from the one supplied earliest to the work loading unit EN, but the present invention not limited to this. For example, when a buffer apparatus is installed adjacent to the work loading unit EN, it is possible to cause the work W loaded first to wait in the buffer apparatus, and process the work W loaded next prior to the work W loaded first.

Each of the work loading unit EN and work unloading unit EX includes a sensor S (see FIG. 4) for sensing the presence/absence of the work W in the apparatus. The control apparatus 40 (to be described later) can receive sensing information indicating the presence/absence of the work W sensed by the sensor S. An example of the sensor S is a sensor which operates in accordance with the weight of the work W when it is placed. Other examples of the sensor S are photoelectric sensors which are arranged in the apparatus and emit light from one sensor to the other, a sensor which reacts with, for example, a metal portion of the work W, and a proximity sensor, but the sensor S is not limited to these examples.

The sensor S for sensing the presence/absence of the work W may also be installed in the processor OP. In this embodiment, however, the transfer system 100 can sense that the work W is loaded into or unloaded from the processor OP by using a chuck sensor CS (to be described later), without using the internal sensor of the processor OP. More specifically, when loading the work W into the processor OP, the work W is transferred into the processor OP when the chuck portion 23 gripping the work W releases it. In this state, the transfer of the work W into the processor OP is completed when the chuck sensor CS senses the release of the work W. Also, when unloading the work W from the processor OP, the chuck portion 23 grips the work W in the processor OP, and the transfer of the work W from the processor OP to the chuck portion 23 is completed when the chuck sensor CS senses the grip of the work W.

<Control Apparatus 40>

Figure 4:
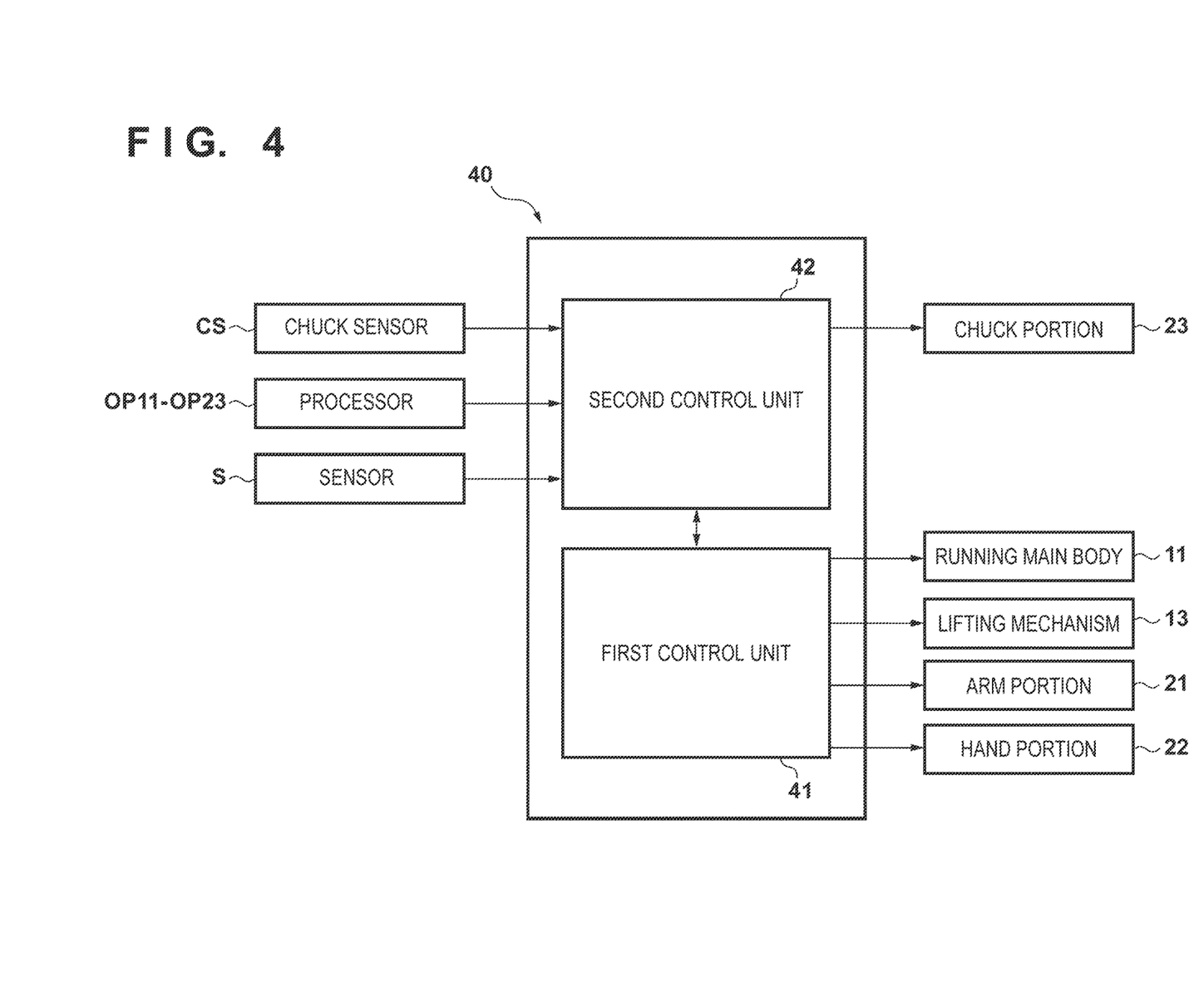
FIG. 4 is a block diagram of a control apparatus.

FIG. 4 is a block diagram of the control apparatus 40 of the transfer apparatus 1. The control apparatus 40 includes first and second control units 41 and 42. The first control unit 41 is, for example, a controller such as a robot controller. Also, the first control unit 41 controls the transfer apparatus 1, that is, controls the run of the running main body 11, the lifting mechanism 13, the pivot of the arm portion 21, the pivot of the hand portion 22, and the like, based on instructions from the second control unit 42 (a control range 110 indicated by the alternate long and two short dashed lines in FIG. 3). Note that the second control unit 42 controls the gripping mechanism 23a and pivoting mechanism of the chuck portion 23 (to be described later). The first control unit 41 includes a storage unit. The storage unit stores the position address of the processing apparatus 30 (to be described later) and coordinates corresponding to the position address. Based on an instruction to move a predetermined processing apparatus 30 based on the position address of the second control unit 42 (to be described later), the first control unit 41 moves the running main body 11 to the coordinates corresponding to the position address in the storage unit.

The second control unit 42 is, for example, a programmable logic controller installed on the installation surface of the transfer system 100, and executes previously programmed processing based on signals from various sensors (to be described later). The second control unit 42 controls the first control unit 41 and the gripping mechanism 23a and pivoting mechanism of the chuck portion 23. Signals corresponding to the completion of the operation and movement of the transfer apparatus 1 by the second control unit 42 are fed back from the first control unit 41 to the second control unit 42 in real time. Examples of the signals from the various sensors are signals from the abovementioned sensors S which are formed in the work loading unit EN, work unloading unit EX, and the like and sense the presence/absence of the work N, and a signal indicating the presence/absence of the work W from the chuck sensor CS (a sensor signal range 120 indicated by the alternate long and two short dashed lines in FIG. 3). These signals are directly supplied from these sensors to the second control unit 42. Also, an example of a signal from each processor OP is a loading/unloading signal indicating the feasibility of loading or unloading of the work W (a loading/unloading signal range 130 indicated by the alternate long and two short dashed lines in FIG. 3). The loading/unloading signal includes a work unloading enable signal indicating that a processed work W having undergone the process by the processor OP can be unloaded, and a work loading enable signal indicating that the processor OP has completed preparations for the process with no work N existing in the processor OP and an unprocessed work N can be loaded. The loading/unloading signal is directly supplied from each processor OP to the second control unit 42.

<Moving Process of Transfer Apparatus 1>

A process in which the transfer apparatus 1 moves to a predetermined processor OP will be explained with reference to FIGS. 3 and 4. For example, a process in which the transfer apparatus 1 shown in FIG. 3 moves to the processor OP12 will be explained. First, the second control unit 42 receives a loading/unloading signal indicating that the work W is loadable from the processor OP12. Based on this loading/unloading signal from the processor OP12, the second control unit 42 checks whether the chuck portion 23 is gripping the work W. If the chuck portion 23 is not gripping any work N, the second control unit 42 notifies the first control unit 41 of the position address of the work loading unit EN so as to move the transfer apparatus 1 toward the work loading unit EN. In this state, the movement of the transfer apparatus 1 to the position address is set in each of the pair of transfer arms 20 mounted on the transfer apparatus 1. Accordingly, the second control unit 42 instructs the first control unit 41 to move the transfer apparatus 1 based on the position address of the work loading unit EN, so that the transfer arm 20 not gripping any work W reaches the work loading unit EN.

The first control unit 41 confirms the coordinates of the work loading unit EN, which correspond to the position address, from the storage unit, and, based on the coordinates, sets the target coordinates of the transfer arm 20 not gripping any work W. Then, the first control unit 41 moves the running main body 11 to a position based on the coordinates by using the coordinates as stop position information. When the movement of the running main body 11 to the coordinates of the work loading unit EN is complete, the first control unit 41 transmits operation completion data to the second control unit 42. Subsequently, the transfer arm 20 performs the loading/unloading process of the work W, and extracts the work W from the work loading unit EN. Note that if the chuck portion 23 is gripping the work W when the second control unit 42 has received the loading/unloading signal from the processor OP, the second control unit 42 notifies the first control unit 41 of the position address of the processor OP12 instead of the work loading unit EN.

Then, the second control unit 42 notifies the first control unit 41 of the position address of the processor OP12, in order to move the transfer apparatus 1 toward the processor OP12. In this state, in the same manner as that for the work loading unit EN described above, the second control unit notifies the first control unit 41 of the position address of the processor OP12 with respect to the chuck portion 23 gripping the work W to be processed. The first control unit 41 having received the position address of the processor OP12 from the second control unit 42 confirms the coordinates of the processor OP12, which correspond to the position address, from the storage unit, and, based on the coordinates, sets the target coordinates of the transfer arm 20. Subsequently, the first control unit 41 moves the running main body 11 to a position based on the coordinates by using the coordinates as stop position information. When the movement of the running main body 11 to the coordinates of the processor OP12 is complete, the first control unit 41 transmits operation completion data to the second control unit 42.

After the transfer apparatus 1 has arrived at the processor OP12, the first control unit 41 drives the transfer arm 20, and performs the loading/unloading process of the work W (to be described below).

<Loading/Unloading Process of Work W>

Figure 5:
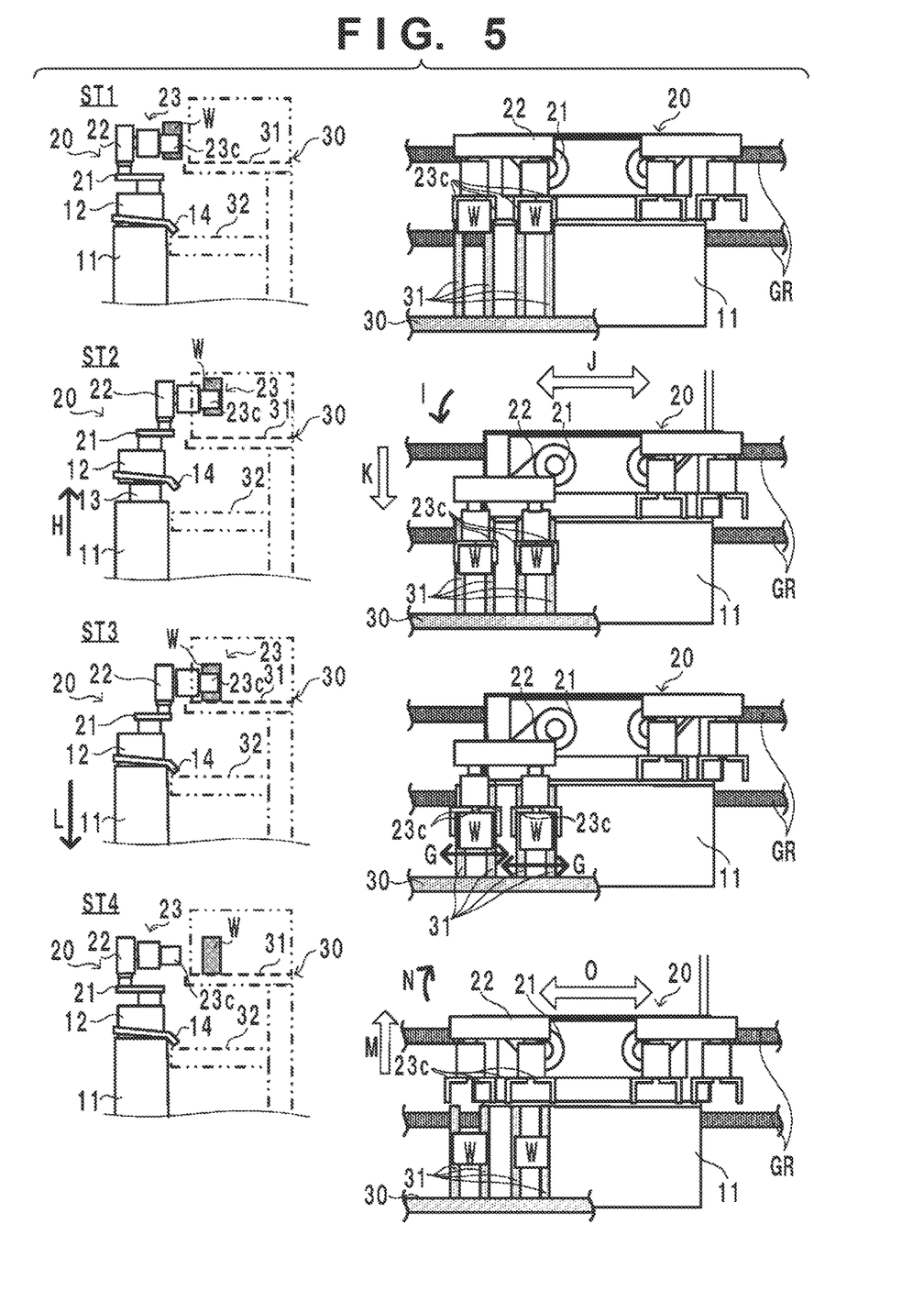
FIG. 5 is a view for explaining a transfer method.

An operation by which the transfer arm 20 loads the work W into the processing apparatus 30 such as the processor OP will be explained with reference to FIG. 5. In state ST1, the transfer apparatus 1 gripping the work W has arrived in front of a predetermined processing apparatus 30. In this state, the transfer arm 20 is in the backward position in order to move within the running width RW (see FIG. 1A). The transfer arm 20 gripping the work W is standing by in front of the loading/unloading guide 31 of the processing apparatus 30. Then, the work W is linearly moved when it is loaded into the processing apparatus 30 by the hand portion 22 facing the processing apparatus 30. More specifically, the first control unit 41 executes control which horizontally pivots the arm portion 21 and horizontally moves the running main body 11.

An operation by which the transfer arm 20 moves the work W to a position above the loading/unloading guide 31 will be explained with reference to state ST2. First, the first control unit 41 raises the robot main body 12 in the direction of an arrow H by using the lifting mechanism 13, in order to avoid collision between the work W and the loading/unloading guide 31. Then, the first control unit 41 performs an arm pivoting step of horizontally pivoting the arm portion 21 at a predetermined angle in the direction of an arrow I, in order to move the work W to a position above the loading/unloading guide 31. In this step, the predetermined angle can be an angle smaller than 90° from a line passing through the arm pivoting shaft 21a and parallel to the transfer path P (see FIG. 1A). Also, the first control unit 41 performs a main body moving step of pivoting the arm portion 21 and at the same time moving the running main body 11 in horizontal directions indicated by arrows J.

This horizontal movement changes in accordance with the standby state of the arm portion 21. First, therefore, a case in which the standby state of the arm portion 21 is that the arm portion 21 is positioned on a side opposite to a line passing through the arm pivoting shaft 21a with respect to the processing apparatus 30 and parallel to the transfer path P will be explained. In this case, while the arm portion 21 is pivoting to a horizontal angle from the line passing through the arm pivoting shaft 21a and parallel to the transfer path P, the running main body 11 is moved in a first direction (rightward in FIG. 5) of the directions of the arrows J simultaneously with the pivoting motion of the arm portion 21. After that, while the arm portion 21 is pivoting to an angle smaller than 90° from the line passing through the arm pivoting shaft 21a and parallel to the transfer path P, the running main body 11 is moved in a second direction (leftward in FIG. 5) of the directions of the arrows J. On the other hand, when the standby state of the arm portion 21 is that the arm portion 21 is positioned on the line passing through the arm pivoting shaft 21a and parallel to the transfer path P or positioned closer to the processing apparatus 30 than the line, the running main body 11 need only be moved in the second direction of the directions of the arrows J simultaneously with the pivoting motion of the arm portion 21.

Then, the first control unit 41 performs a hand portion pivoting step of pivoting the hand portion 22 so that one side surface of the work W moves while facing the processing apparatus 30. Thus, the first control unit 41 performs the control process of operating the running main body 11, arm portion 21, and hand portion 22 in cooperation with each other, thereby linearly moving the work W toward the processing apparatus 30 as indicated by an arrow K. As described above, the hand portion 22 can linearly be moved toward the processing apparatus 30 by horizontally moving the running main body 11 simultaneously with the pivoting motion of the arm portion 21. Even when the running width RW is narrow, therefore, the transfer arm 20 can efficiently be accommodated without exceeding the running width. In other words, the transfer apparatus 1 according to this embodiment can narrow the accommodation width of the transfer arm 20, that is, the running width RW, and hence can decrease the footprint.

When the arm portion 21 pivots without the abovementioned main body moving step, the hand portion 22 moves while drawing an arc indicated by the arrow I. In this embodiment, however, the running main body 11 is horizontally moved, so the work W is linearly moved when the hand portion 22 facing the processing apparatus 30 loads or unloads the work W into or from the processing apparatus 30.

An operation by which the transfer arm 20 places the work W on the loading/unloading guide 31 will be explained with reference to state ST3. From state ST2 in which the work W has been moved to the position above the loading/unloading guide 31, the first control unit 41 operates the lifting mechanism 13, thereby moving the robot main body 12 downward in the direction of an arrow L and placing the work W on the loading/unloading guide 31. Then, the second control unit 42 for controlling the chuck portion 23 receives an operation completion signal from the first control unit 41, and drives the gripping mechanism 23a of the chuck portion 23, thereby performing a chuck opening/closing step of opening the gripping portions 23c of the chuck portion 23 in the directions of the arrows G.

Lastly, an operation by which the transfer arm 20 moves to the backward position with respect to the loading/unloading guide 31 will be explained with reference to state ST4. To move the transfer arm 20 to the backward position, the first control unit 41 pivots the arm portion 21 in the direction of an arrow N, and moves the running main body 11 in horizontal directions indicated by arrows O. Note that the first control unit 41 pivots the hand portion 22 such that the gripping portions 23c face the processing apparatus 30. By thus performing the operation reverse to the operation explained with reference to state ST2, collision between the work W and the processing apparatus 30 can be avoided while the chuck portion 23 is moving backward. After that, the transfer apparatus 1 becomes movable on the transfer path P.

The operation of loading the work W into the processing apparatus 30 is completed through the process described above. In this embodiment, therefore, it is possible to obtain the transfer apparatus 1 capable of linearly moving the hand portion 22 toward the processing apparatus 30 although the number of joints is small, and having a compact apparatus configuration. When unloading the work W from the processing apparatus 30, the process is reverse to the aforementioned process. When controlling the run of the running main body 11, the lifting mechanism 13, the pivot of the arm portion 21, and the pivot of the hand portion 22, the first control unit 41 does not feed back position information of these members when operating them, and manages them by the time axis. The second control unit 42 sends operation instructions to the first control unit 41, and sometimes determines that an error has occurred if no operation completion information is transmitted to the second control unit 42, or if a difference from an expected response time between the operation instruction information and the completion information increases. In this case, the first control unit 41 can interrupt the control. In the transfer system of this embodiment, the loading/unloading order of the works W with respect to the processing apparatuses 30 is determined by programming performed beforehand by the second control unit 42. Also, the first control unit 41 may also feed back position information of the members when operating them. This makes it possible to complement positional shifts between the individual operations.

In this embodiment, the transfer apparatus 1 includes the pair of transfer arms 20, and hence can, for example, load and unload the works W into and from the processor OP in quick succession. Also, if the processing time changes in accordance with the type of the processor OP, for example, the works W can successively be unloaded from the processor OP by using the hand portions 23 of the pair of transfer arms 20. In the transfer system of this embodiment, if the loaded work W is manually extracted due to, for example, an error of the processor OP, it is also possible to output a loading/unloading signal again as a loading enable signal by, for example, resetting the processor OP, and load the work W by the transfer arm 20 based on the signal. Furthermore, if the work W is manually supplied to the processor OP, it is also possible to output a loading/unloading signal as an unloading enable signal from the processor OP after the work is complete, and unload the work W by the transfer arm 20 based on the signal.

Other Embodiments

Figure 6A:
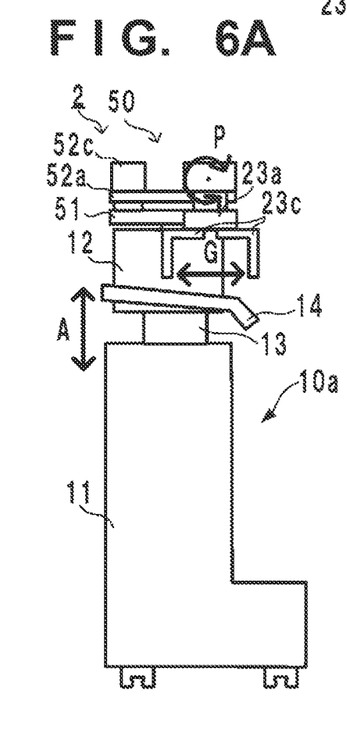
FIGS. 6A, 6B, and 6C are a side view, plan view, and front view, respectively, of a transfer apparatus according to another embodiment.
Figure 6B:
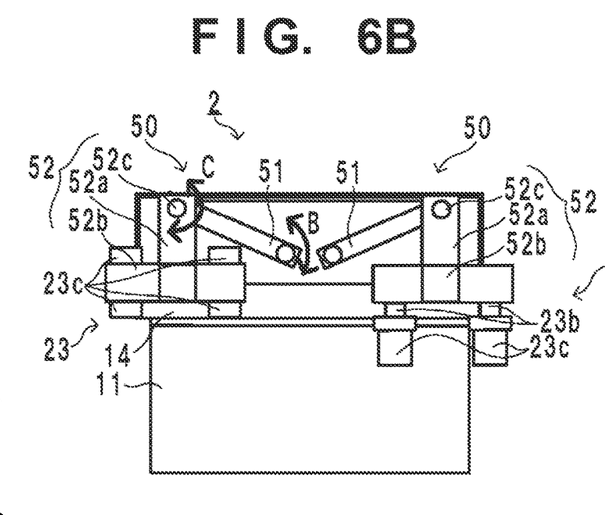
Figure 6C:
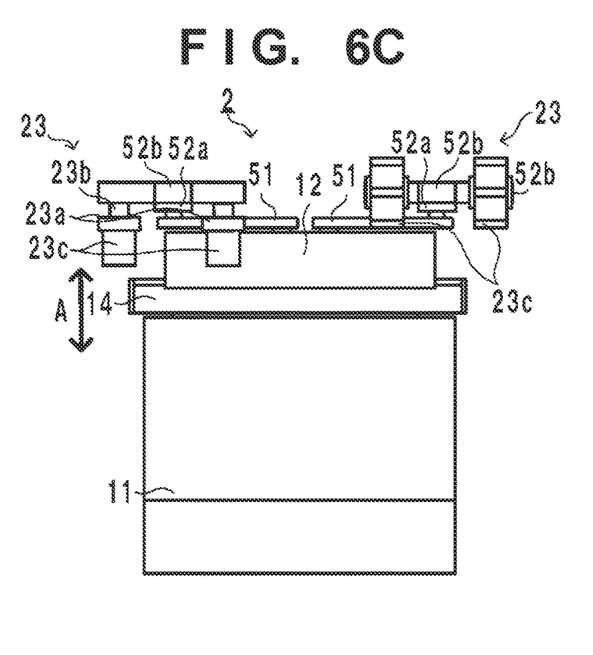

FIGS. 6A, 6B, and 6C show a transfer apparatus 2 according to another embodiment. FIG. 6A is a side view, FIG. 6B is a plan view, and FIG. 6C is a front view. In this embodiment, the arrangement of a transfer arm 50 is different from that of the transfer arm 20 of the abovementioned transfer apparatus 1, and the arrangements of a main body 10 and control apparatus 40 are the same as those of the transfer apparatus 1. The transfer arm 50 includes an arm portion 51 and hand portion 52. The arm portion 51 is an elongated plate-like member having a rectangular shape in a planar view. The arm portion 51 has one end pivotally formed in a robot main body 12 by an internal driving mechanism of the robot main body 12, and the other end pivotally formed in the hand portion 52. The hand portion 52 includes an extended portion 52a as a plate-like member having a rectangular shape in a planar view, and a chuck support portion 52b on which a chuck portion 23 is formed. The chuck portion 23 is formed on the chuck support portion 52b so as to be pivotal around an axis perpendicular to the longitudinal direction of the extended portion 52a (in the directions of arrows P in FIG. 6A).

In this embodiment, the chuck portion 23 can pivot in the directions of arrows P around the horizontal axis with respect to the chuck support portion 52b. Therefore, a work W can be placed in both the vertical direction and horizontal direction. Note that FIGS. 6B and 6C show a state in which the chuck portion 23 on the right-hand side of FIGS. 6B and 6C is pivoted in the directions of the arrows P from the state shown in FIG. 6A in which the chuck portion 23 faces down. As a modification of this embodiment, the transfer apparatus 1 may also include the transfer arm 20 in which both the pair of chuck portions 23 face down in the vertical direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2014-206663, filed Oct. 7, 2014, which is hereby incorporated by reference herein in its entirety.

What is claimed is:

1. A transfer apparatus for loading/unloading a work into/from a processing apparatus, comprising:
   a running main body configured to move in a horizontal direction;
   a robot main body mounted on the running main body;
   at least one transfer arm provided with the robot main body, the transfer arm including an arm portion pivotally provided with respect to the robot main body and a hand portion which is pivotally provided with respect to the arm portion and is configured to grip the work; and
   a control unit configured to horizontally swing the arm portion and move the main body in order for the hand portion to linearly move the work, when the hand portion facing the processing apparatus loads/unloads the work into/from the processing apparatus,
   wherein the running main body includes a lifting mechanism configured to move the robot main body up and down,
   wherein the transfer apparatus further compromises a cover member placed below the robot main body and above an oil pan disposed on the processing apparatus,
   wherein the lifting mechanism is configured to move the cover member up and down with the robot main body,
   wherein the cover member has a surface inclining toward the oil pan,
   wherein the hand portion has:
   a hand main body connected to the arm portion; and
   two chuck portions provided to the hand main body,
   wherein each chuck portion has:
   a gripping mechanism configured to grip the work; and
   a pivoting mechanism configured to pivot the gripping mechanism about a horizontal axis perpendicular to an open-close direction of the gripping mechanism, and
   wherein control unit controls the up and down movement of the lifting mechanism, a pivoting of the hand portion, the gripping mechanism and the pivoting mechanism.

2. The apparatus according to claim 1, wherein
   the arm portion is connected to a pivot of the robot main body at one end side thereof and to the hand portion at the other end side thereof.

3. The apparatus according to claim 1, comprising two transfer arms.

4. The apparatus according to claim 3, wherein
   the arm portion is connected to a pivot of the robot main body at one end side thereof and to the hand portion at the other end side thereof.

5. The apparatus according to claim 1, wherein
   at least the arm portion and the hand portion are configured to stand by within a predetermined running width when not in use,
   the arm portion is connected to a pivot disposed in the robot main body at one end side thereof and to the hand portion at the other end side thereof, and
   the hand portion has an arm-portion-driving-mechanism driving the arm portion about the pivot so as to move the hand portion between a backward position within the running width and a forward position outside of the running width,
   the running width being defined by a transfer path through which the arm portion and the hand portion travel when the transfer apparatus moves, the running width being smaller than a width of the main body.

6. The apparatus according to claim 1, wherein the gripping mechanism includes a pair of L-shaped gripping portions which are opened and closed so as to grip the work.

7. A transfer apparatus for loading/unloading a work into/from a plurality of processing apparatuses, comprising:
   a running main body being able to move in a horizontal direction;
   a robot main body mounted on the running main body;
   at least one transfer arm provided with the robot main body, the transfer arm including an arm portion pivotally provided with respect to the robot main body and a hand portion which is pivotally provided with respect to the arm portion and is configured to grip the work;
   a control unit configured to horizontally swing the arm portion and move the main body in order for the hand portion to linearly move the work, when the hand portion facing the processing apparatus loads/unloads the work into/from the processing apparatus; and
   wherein the running main body includes a lifting mechanism configured to move the robot main body up and down,
   wherein the transfer apparatus further comprises a cover member placed below the robot main body and above an oil pan disposed on the processing apparatus,
   wherein the lifting mechanism is configured to move the cover member up and down with the robot main body,
   wherein the cover member has a surface inclining toward the oil pan,
   wherein the arm portion is connected to a pivot of the robot main body at one end side thereof and to the hand portion at the other end side thereof,
   the hand portion has a main body of the hand portion connected to the arm portion and a chuck portion provided to the main body of the hand portion,
   the chuck portion is configured to grip the work and pivots around an axis being parallel to a direction for loading/unloading a work into/from a processing apparatus, and
   the control unit is configured to further control the up and down movement of the lifting mechanism and a pivoting of the chuck portion in order to load/unload the work into/from each of the plurality of the processing apparatuses.

8. A transfer system for loading/unloading a work into/from a plurality of processing apparatuses, comprising:
   a transfer path arranged along a plurality of loading/unloading ports of the processing apparatuses; and
   a transfer apparatus configured to load/unload the work into/from the processing apparatus,
   wherein the transfer apparatus comprises:
   a running main body being able to move in a horizontal direction along the transfer path;
   a robot main body mounted on the running main body;
   at least one transfer arm provided with the robot main body, the transfer arm including an arm portion pivotally provided with respect to the robot main body and a hand portion which is pivotally provided with respect to the arm portion and is configured to grip the work;
   a first control unit configured to horizontally swing the arm portion and move the running main body in order for the hand portion to linearly move the work, when the hand portion facing the processing apparatus loads/unloads the work into/from the processing apparatus; and a second control unit configured to control the hand portion and the first control unit based on a signal from the processing apparatus, wherein the running main body includes a lifting mechanism configured to move the robot main body up and down, wherein the transfer apparatus further comprises a cover member placed below the robot main body and above an oil pan disposed on the processing apparatus, wherein the lifting mechanism is configured to move the cover member up and down with the robot main body, wherein the cover member has a surface inclining toward the oil pan, wherein the hand portion has:

a hand main body connected to the arm portion; and two chuck portions provided to the hand main body, wherein each chuck portion has:

a gripping mechanism configured to grip the work; and a pivoting mechanism configured to pivot the gripping mechanism about a horizontal axis perpendicular to an open-close direction of the gripping mechanism, and wherein the first control unit is configured to further control the up and down movement of the lifting mechanism.

* * * * *